United States Patent

Ries et al.

Patent Number: 6,061,724
Date of Patent: May 9, 2000

[54] MODELLING PROCESS FOR AN INFORMATION SYSTEM, IN PARTICULAR WITH A VIEW TO MEASURING PERFORMANCE AND MONITORING THE QUALITY OF SERVICE, AND A MEASUREMENT AND MONITORING SYSTEM IMPLEMENTING THIS PROCESS

[75] Inventors: Alain Ries, Jouy-En-Josas; Loïc Mathieu, Cachan; Manuel Stopnicki, Paris, all of France

[73] Assignee: Infovista SA, Villebon sur Yvette, France

[21] Appl. No.: 09/015,658

[22] Filed: Jan. 29, 1998

Related U.S. Application Data

[60] Provisional application No. 60/046,239, May 12, 1997.

[30] Foreign Application Priority Data

Jan. 29, 1997 [FR] France ................... 97-00965

[51] Int. Cl.[7] .................................. G06F 15/16
[52] U.S. Cl. .......................... 709/224; 709/223
[58] Field of Search ................... 709/224, 223; 710/17, 18; 714/39; 719/47, 51; 707/103, 104

[56] References Cited

U.S. PATENT DOCUMENTS

| | | | |
|---|---|---|---|
| 5,459,837 | 10/1995 | Caccavale | 709/226 |
| 5,852,736 | 12/1998 | Shipmon et al. | 395/726 |
| 5,870,585 | 2/1999 | Stapleton | 395/500 |

FOREIGN PATENT DOCUMENTS

| | | |
|---|---|---|
| 0 549 504 | 6/1993 | European Pat. Off. . |
| WO 96/26588 | 8/1996 | WIPO . |

OTHER PUBLICATIONS

V. Catania et al., "Monitoring performance in distributed systems", pp. 788–802, Computer Communications, 1996.

Sameh Rabie, "Integrated network management: Technologies and implementation experience", pp. 1020–1027, IEEE Infocom '92 Florence, Italy, May, 1992.

Walter Widl, "CCITT standardisation of telecommunications management networks", pp. 34–51, Ericsson Review, vol. 68, No. 2, 1991.

T. K. Apostolopoulos et al., "A model for SNMP based performance management services", pp. 269–273, IEEE Singapore International Conference on Networks/International Conference on Information Engineering , Jul. 3–7, 1995.

Ying–Dar Lin et al., "A framework for learning and inference in network management", pp. 560–564, IEEE Global Telecommunications Conference, Dec. 6–9, 1992.

*Primary Examiner*—Mehmet B. Geckil
*Attorney, Agent, or Firm*—Young & Thompson

[57] ABSTRACT

Process for modelling an information system, in order to measure performance and monitor service quality for this information system. Data relating to a first Instance are collected on the first Instance or on one or several other Instances. These collected data are attached to this first Instance via the model of the information system. Classes of objects of the information system, called Vistas, are defined, each Vista comprising Properties and/or Indicators, the Instances of the information system belonging to one or several Vistas. The process further comprises rules defining inheritances between different Vistas. Various models of the information system can be defined from a same set of Vistas via different rules.

12 Claims, 6 Drawing Sheets

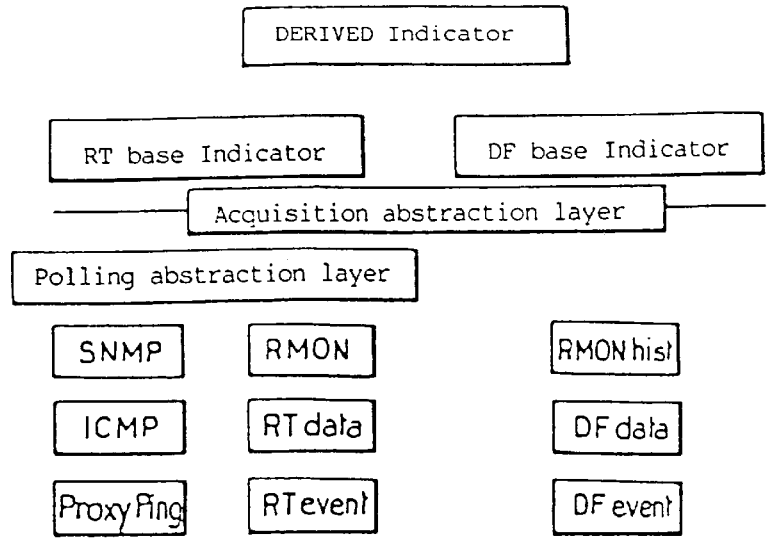
FIG_5
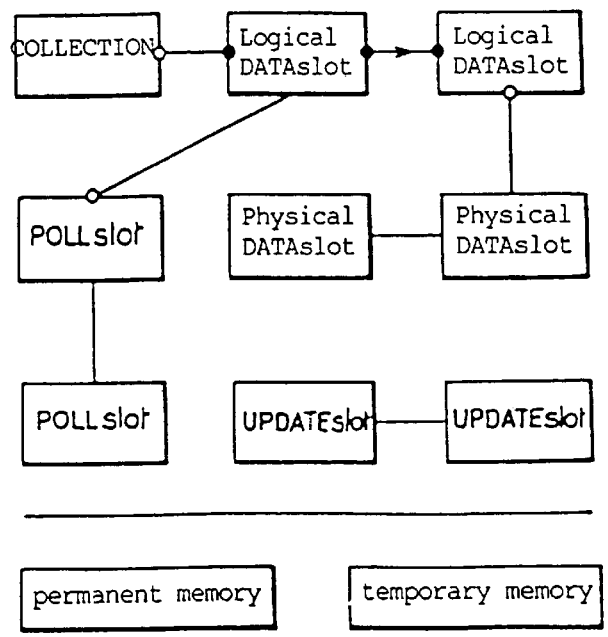
FIG_6

6,061,724

MODELLING PROCESS FOR AN INFORMATION SYSTEM, IN PARTICULAR WITH A VIEW TO MEASURING PERFORMANCE AND MONITORING THE QUALITY OF SERVICE, AND A MEASUREMENT AND MONITORING SYSTEM IMPLEMENTING THIS PROCESS

CROSS-REFERENCE TO RELATED APPLICATION

This present application claims priority under 35 USC §119(e) of earlier copending provisional application Ser. No. 60/046,239 filed on May 12, 1997.

FIELD OF THE INVENTION

The present invention relates to a modelling process for an information system, in particular with a view to measuring performance and monitoring the quality of service. It also relates to a decisional information system implementing this process.

BACKGROUND OF THE INVENTION

The increasing complexity of information systems which integrate in particular client-server architectures and integrated local area networks renders measurement of performance and an efficient monitoring of service quality within these systems increasingly difficult. On the one hand, the administrators and managers of these information systems have been led to adopt a service-oriented approach towards users and to operate as service providers intent on providing quality services while confronted with reduced operating costs and, on the other hand, the users of these services are demanding ever higher levels of service quality.

Ensuring service quality requires a reliable system for retrieving relevant information from the various information system resources. However, it is difficult to exploit large-volume performance data sources located in network devices, in systems and in software applications, to consolidate this data and then to restore it in the form of summary reports for capacity or service quality management purposes. What is required is, on the one hand, management of service quality at user level: availability, application response time, reactivity of technical support in the event of an incident and, on the other hand, management of technical service quality relating to the infrastructure itself: traffic, network transit times, CPU time consumption, etc.

There already exist software products which supply service quality monitoring information within information systems, such as "TRENDsnmp+" from the company DESKTALK Systems Inc., which comprises a set of generic applications for the collection and collation of data, management and generation of reports and logs. This software package can process data originating from any devices supporting the SNMP protocol (Simple Network Management Protocol), and includes specialised support for the MIB Remote Monitoring standard (RMON).

Another known product is "Network Health" from the company CONCORD. This product consists of a family of automated solutions for network analysis and report generation.

Another product is "Perfagent" from the company ACANTHE SOFTWARE. This product is a multi-platform operations management report generator for an SNMP environment. It provides real time monitoring, Indicator archiving in relational databases and offline analysis of the status of the components of a network or an information system.

The product "ISM statistics" from the company BULL automates the collection and management of data as well as the creation of reports for statistical management of an information system. Collected data is organised around object classes representing real network elements. For each object class, this product provides data, called Indicators, representing each object's load or activity. It processes Indicators, in particular by summary or filtering. Information is stored in a relational database.

The product "Performance Reporter" from the company IBM also provides a set of management and other reports for management of the service quality of an information system, and in particular it supports the SNMP protocol. Another network management product which can be mentioned is "SPECTRUM" from the company CABLETRON SYSTEMS Inc. This product in particular includes a service quality management module based on inductive modelling of the network. Document WO9626588 (Cabletron Systems) discloses a process for managing network configurations grouping at least one network element to form a network group. An identifier is supplied for each network device and a database is modified to contain a relationship between the device and the group identifier.

Document US5459837 (Digital Equipment Corporation) discloses a process and a system for measuring the performance of servers within a network.

The document "Monitoring performance in distributed systems", published in COMPUTER COMMUNICATIONS, Vol.19, No.9/10, pages 788–802, August 1996, discloses a process for continuously monitoring distributed systems, that implements an oriented-object approach for the management of the various elements of a distributed system. The oriented-object model used in this process includes the concepts of class and inheritance.

The document "Integrated network management: technologies and implementation experience", published in IEEE INFOCOM, Vol.2, pages 1020–1027, August 1992, discloses methods of integrated network management implementing an oriented-object modelling for the logical and physical components of the network and their related data. The described model comprises two types of relations between objects: a relation "parent" for notifying to a component the status of its "children", and a relation of dependance that is used for deriving the status of an object from its support components.

The document "CCITT standardisation of telecommunications management networks", published in ERICSSON REVIEW, Vol.68, No.2, pages 34–51, January 1991, discloses CCITT standardisation works for network management systems, including an oriented-object approach. Every managed object belongs to a class that can be a sub-class of an another class. The sub-class inherits all the properties of the class on which said sub-class is dependent. The different classes are submitted to an inheritance hierarchy.

Now, to provide efficient measurement of performance and service quality monitoring of increasingly complex systems, it is necessary to carry out overall modelling of the information system, which can lead to homogenisation of the information system's objects and the collected data.

SUMMARY OF THE INVENTION

The purpose of the present invention is to propose a modelling process for an information system in order to measure performance and monitor service quality within an information system, which can achieve this objective.

This objective is achieved with a process for modelling an information system, in order to measure performance and monitor service quality for this information system, this process including object-oriented modelling of this information system, each element of said information system being represented by an Instance, wherein:

data relating to a first Instance are collected on said first Instance or on one or several other Instances, said collected data can be attached to said first Instance via the model of the information system, classes of objects of the information system, called Vistas, are defined, each Vista comprising Properties and/or Indicators, the instances of the information system belonging to one or several from said Vistas.

According to the invention, the process further comprises rules defining inheritances between different Vistas, and different models of the information system can be defined from a same set of Vistas, via different rules.

Thus, when necessary, a decorrelation can be carried out between the Instance to which related data will be attached and the Instance(s) from which data will in fact be collected.

As examples, three cases allow the implementation of this decorrelation:

information relating to the CPU load of a server will be collected directly from this server (no decorrelation);

if the average response time for SQL requests to a relational database is required: network probes are interrogated, thus determining the elapsed time between the requests and the database's responses; in this case, the probes are interrogated but not the relational database. Yet the collected data will be attached to the relational database;

if the availability of a geographical site is required: the devices of this site are interrogated in order to measure their individual availability, and to compute site availability. The result is attached to the "Site" object.

This decorrelation, which has no equivalent in modelling processes of the prior art has the particular effect of allowing a high level of flexibility in the retrieval of diverse and heterogeneous data sources. Moreover, it allows the various acquisition, calculation and storage processes to be conducted integrally with an object-oriented approach.

The object-oriented modelling of the information system includes, in a preferred form of implementation of the modelling process according to the invention, modelling of the information system infrastructure, modelling of collected data in the form of indicators computed from variables representing elementary data collected within this information system and modelling of reports to be generated.

With the modelling process according to the invention, this is indeed object-oriented modelling which, in addition to simple modelling of information system infrastructure elements, also incorporates modelling of collected data and the results of the processing of this data, whatever the nature of this data.

Processed and generated objects are preferably all stored in an object database which can be accessed for any future consultation.

Using the process according to the invention, it becomes possible to display service quality information from an operational, geographical, technical or commercial point of view. This process can provide summary management reports on performance and costs, while keeping a log of activity and variations relative to service objectives for a given period and within a defined boundary. These management reports can be used to monitor the quality of service provided to users, to anticipate any deviations and to take any necessary decisions in order to guarantee and respect service undertakings. A systems or networks manager can also monitor over a long period or in real time the technical Indicators relating to information system objects managed by the process according to the invention: servers, network and telecommunications devices, specific applications or software packages, etc.

In a preferred form of implementation of the process according to the invention, an Indicator contains a plurality of Formulas each combining a set of Variables, and the processing process comprises, for each Indicator requested in a report, a dynamic choice of a Formula from the plurality of Formulas associated with this Indicator, this choice being in particular determined according to the respective availability of the variables required by each of the said Formulas in the data source used and as a function of the priorities assigned to each of the Formulas.

It can also be advantageous for the modelling process according to the invention to include data warehousing techniques, in particular in order to keep a log of all the information collected. It retrieves and memorises all developments in the information system (additions, deletions or modified objects), and automatically assigns them to the appropriate management reports. Therefore, consulting a management report relating to a past period only retrieves the information system objects present at that time and not those defined at the time the management report is consulted.

It can be advantageous for the modelling process according to the invention to be implemented within an information system performance measurement and service quality monitoring process in which the three following types of data source are homogenised:

1) data acquired by real-time polling 2) data, in particular continuous or discrete data (events), acquired in real time from an external source, 3) data, in particular continuous or discrete data (events), acquired off-line from an external source which supplies the server with the log of variables in the form of a timestamped data list.

A practical method of implementation consists in carrying out this homogenisation in the form of a so-called polling abstraction stage to group data acquired in real time from various data sources (types 1 and 2) and an acquisition abstraction stage to homogenise (i): real time data resulting from the polling abstraction stage and (ii): data acquired off-line (type 3).

This homogenised data is represented by objects attached to objects resulting from the information system modelling and concerned with this data.

By "polling" is meant a mechanism by which a master process (server) regularly interrogates a local or remote agent process in order to submit a request, for example for the transmission of data.

The acquisition of data from an external source is different from polling in that, in this case, the server does not control the time of arrival of the data from this external source.

According to another aspect of the invention, a performance measurement and service quality monitoring system is proposed for a distributed information system, implementing the modelling process according to the invention, this system including:

means for performing object-oriented modelling of the information system, each element of said information system being represented by an Instance, said oriented-object modelling means being arranged for defining classes of objects of the information system, called Vistas, and for setting rules defining inheritances between different Vistas, means for modelling and collecting data within the information system, said collected data coming from various data sources, means for processing collected data and for computing Indicators, in particular service quality Indicators, and means for generating reports and/or graphs from these indicators.

According to the invention, the object-oriented modelling means are further arranged to generate rules defining inheritances between different Vistas and for defining, from a same set of Vistas, via different rules, different models of the information system.

BRIEF DESCRIPTION OF THE DRAWINGS

Other features and advantages of the invention will appear in the description below. In the annexed diagrams given as non-limitative examples:

FIG. 5 is a block-diagram explaining a possible structuring of the Indicators implemented in the process according to the invention;

FIG. 6 is a block-diagram explaining the structure of data "slots" within a practical implementation of the process according to the invention;

DETAILED DESCRIPTION OF THE INVENTION

First of all there follows a set of definitions and concepts which will be used throughout the present description.

The information system is composed of elements or instances (network devices, systems, . . . ). An instance belongs to one or more object classes. Each object class has a certain number of attributes or properties which define the object.

The model can be divided into three domains:
- the information system infrastructure model (networks, systems and applications),
- the collected data and Indicator model,
- the report model which will be generated.

The objects of the process according to the invention are used to model these domains.

Figure 4A:
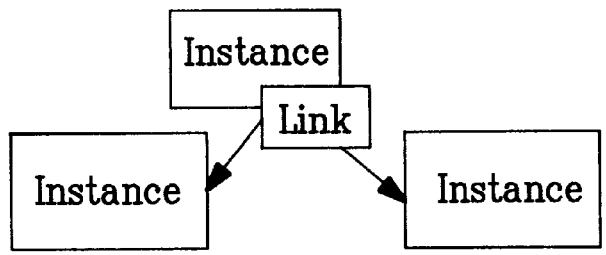
FIGS. 4A, 4B and 4C schematically represent the relationships relating to Instances, Groups and Indicators.
Figure 4B:
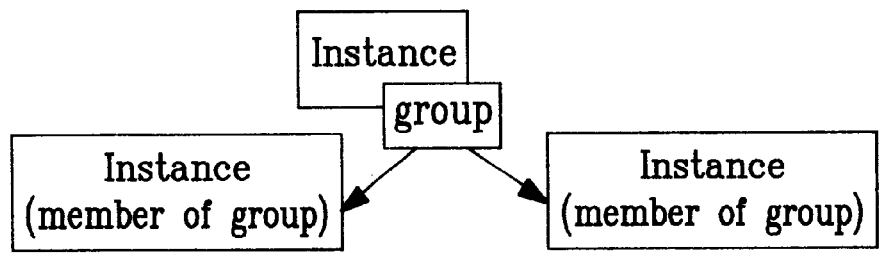

The main aspects of a modelling implemented in the process according to the invention will now be described. An element managed in the information system is represented by an Instance. Instances can be connected via links (FIG. 4A) and can be members of a group (FIG. 4B). A managed element has several attributes called Property values. The managed element can have several characteristics each defined by a Vista. The Vista defines which Properties the Instance must have.

The Vista object represents a facet, a category to which an element can belong, or a fundamental characteristic of an element. It indicates the properties of this facet.

Each element of the information system belongs to one or more Vistas. The vistas can be modified by rules. Each rule is represented by a Rule object. This object allows relationships between Vistas to be defined. Thus, a rule can be used to specify that an Instance belonging to a given Vista will automatically belong to another Vista. Thus any Vista can inherit both its properties and its indicators from another Vista. Unlike object designs where the inheritance is defined in a fixed manner, in the present invention, the rules can be used to define inherited features between the various Vistas. This allows great flexibility in defining objects and object classes in an information system. As an example, the three following Vistas are considered, 1) an IP Nodes Vista comprising all the elements of the network or information system having an IP address, 2) an IPX Nodes Vista comprising all the elements of the network or information system having an IPX address, 3) a Router Vista comprising all the devices of the information system having a data routing function. Depending on the case, the Router can be configured to route IP protocol. In this case, a rule will specify that the Vista rule will inherit from the IP Nodes Vista. In another case, the Router will be configured to route IPX protocol. In this case, the rule will specify that the Router Vista inherits from the IPX Vista. Finally, in the last case, the Router can be configured to route the IP and IPX protocols. In this case, two rules will specify that the Router Vista will inherit both from the IP Nodes Vista and from the IPX Nodes Vista.

The main aspects of Indicator modelling will now be described. Each Indicator is represented by an Indicator object (FIG. 5). As an example, an Indicator can be "availability" or "service quality". An Indicator is calculated from several variables or from several other Indicators, using a Formula chosen from several Formulas. The process according to the invention processes two types of variable:

real time variables, deferred variables.

An Indicator calculated directly from variables is called a Base Indicator (RTbase for a real time Indicator or DFbase for a deferred Indicator), whereas an Indicator calculated from other Indicators is called a DERIVED Indicator.

It should be noted that this difference between Base Indicators and DERIVED Indicators can be masked from users by letting the system automatically determine the Indicator type.

Indicators are thus classified into three categories:

RTbase Indicators are real time acquisition variable functions. When the server wishes to calculate the value of such an Indicator at a given moment, it requests the values of the different variables needed at the same moment and performs the calculation;

DFbase Indicators are deferred acquisition variable functions. When the server receives the variable log, it updates the corresponding Indicators.

After receipt and processing of variables, nothing further should differentiate the data stored on a DFbase Indicator from that stored on an RTbase Indicator; that is, nothing should now indicate that the variables were not acquired in real time;

DERIVED Indicators are functions of other Indicators (equally well RTbase, DFbase and DERIVED). They are evaluated using a propagation mechanism: the server triggers evaluation of a DERIVED Indicator as soon as the values of its component Indicators are available.

DERIVED Indicators enhance the server's features, in particular by allowing:

use of multi-Instance aggregation functions, use of RTbase and DEbase Indicators within a single formula, use of functions based on the data log, which the RTbase and DEbase Indicators cannot provide as they are built from variables which do not encompass the notion of log.

A calendar can also be associated with an Indicator. The Calendar object specifies periods of time in which Indicator data is significant. An optimisation consists in not collecting data when it is not significant.

An Indicator's type is computed by operators from the variables or Indicators which constitute it by applying type combination rules.

It is possible to indicate that values are not to be kept for a DERIVED Indicator. Each value request for an Indicator then entails a recalculation. This avoids the need to store an Indicator which can easily be computed from another Indicator, for example using the offset lag. This allows users to make their own choice balancing storage space against calculation time.

The definition of each Indicator includes a maximum data acquisition time. This time is nil for an RTbase Indicator, user-specified for a DFbase Indicators and computed for a DERIVED Indicator. Users can then make their own choice balancing necessary storage space against data availability time determined for deferred acquisition variables.

The calculation of an Indicator which can be consolidated over a given period of time is carried out from basic data collected in real time, by calculating the Indicator and then consolidating the result obtained (on average). The calculation of an Indicator which cannot be consolidated is carried out by first consolidating the basic data (on average) then calculating the Indicator.

The mathematical formulas used to calculate an Indicator are expressions. An expression can contain:

Indicators,

Scalar or multidimensional Variables,

Parameters of these variables or Indicators, and in particular their size,

Properties,

Operators,

Constants, text, carriage returns.

As regards operators, in addition to the arithmetical operators addition, subtraction, multiplication and division: +, −, ×and / specific operators can be mentioned such as reduction operators, conversion operators and time operators.

Reduction operators can be used to reduce the size of one or more expressions, for example, the average value of an Indicator for a group of Instances or the minimum and maximum.

Conversion operators can be used to change the type of an expression, for example the conversion of an integer to a float.

Time operators can be used to access the "time" dimension of values. They only operate on Indicators. For example, the operator BaselineDay [Indicator, n] generates a "daily Baseline" graph consolidated over a period of n days. A "daily Baseline" graph is a reference graph illustrating the average profile or typical profile of an Indicator for a day. It is calculated by averaging the collected data over n successive days.

An operator select can be used to carry out an expression test. If the test is true, the value of the expression returned by the select operator is that of the first expression in the argument list and, if not, the value is that of the second expression.

An operator merge can be used to create composite parameters. It merges the values of an expression with the parameter of another in order to create a composite parameter. The parameters of the two expressions must be identical.

As an example, Indicators can be grouped in sets called Metrics. Each Metric can be represented by a graph or a diagram. Diagrams can be grouped in management reports.

There now follows a description of the process for measuring performance in which the modelling process according to the invention is implemented both from a hardware point of view and from a software point of view, with reference to the previously mentioned figures.

Figure 1:
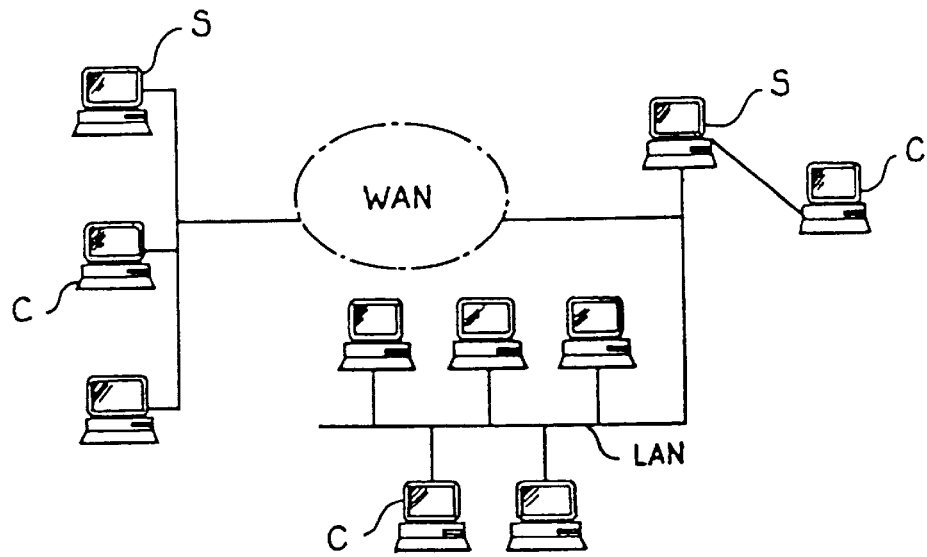
FIG. 1 schematically represents an information system for which the modelling process according to the invention is implemented.

The modelling process according to the invention can in practice be implemented in the form of software building blocks within a software program installed on a server S connected to a local area network, and on local or remote (WAN) networked client stations (C), with reference to FIG. 1.

Figure 2:
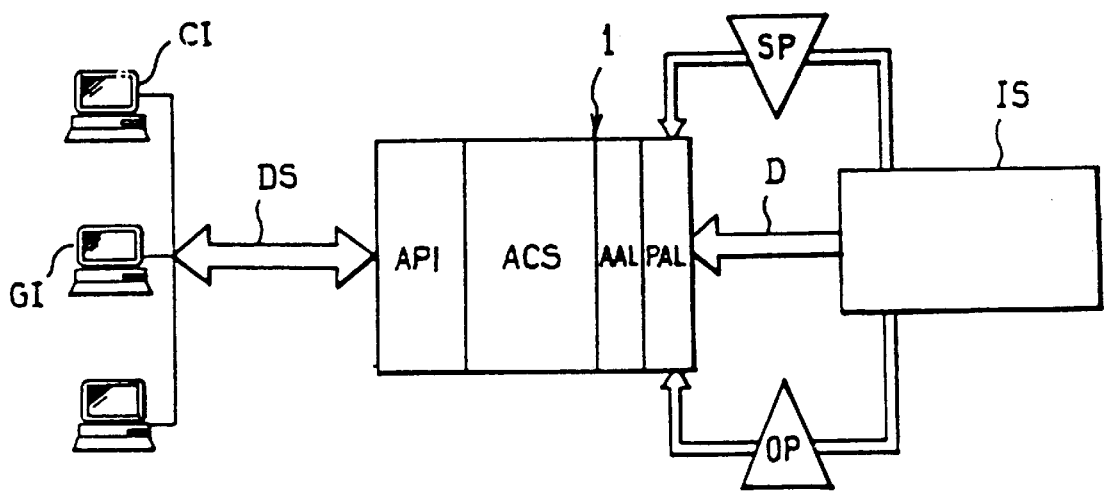
FIG. 2 schematically represents the interactions between a performance measurement and quality monitoring process implementing the modelling process according to the invention, and an information system.

The modelling process according to the invention can for example be implemented in a measurement and monitoring process having a software structure 1 appropriate on the one hand to an information system IS from which data D will be taken and on the other hand to client user interface stations CI and graphics stations GI, with reference to FIG. 2. The data transfer protocols originating from the information system IS include either standard protocols SP such as the SNMP or CMIP protocols or other protocols OP. Data transfers between client stations and the measurement and monitoring process are carried out for example according to the standard transfer method DCE.

The internal structure 1 of the measurement and monitoring process includes, as a non-limitative example, an initial polling abstraction layer PAL, a second acquisition abstraction layer AAL, an acquisition, calculation and storage layer ACS, and a layer for the interface with user stations API. The acquisition, calculation and storage functions constitute the heart of the server used in the system according to the invention. They are described using a static model and a dynamic model. The static model is constituted by a set of structures describing the data which it is wished to obtain. The dynamic model is constituted by a set of structures and tasks which will be used to obtain this data. The static model is based on two fundamental concepts, namely Variables and Indicators.

As the software which implements the process according to the invention is client-server, it can therefore be distributed over one or more networks. Servers can be installed on one or more points of a network to provide data acquisition, processing and storage. Client machines can be installed in various geographical locations according to requirements. In this way, information system managers and decision-makers can implement a performance measurement and quality monitoring process implementing the process according to the invention from their own offices in order to prepare reports. The Clients and the Server communicate for example using the communication standard DCE which can ensure interoperability across heterogeneous platforms. Moreover, as the information system develops, the client-server architecture allows a dialogue between client and servers running different operating systems.

A specific method for carrying out the data homogenisation process implemented with the modelling process according to the invention will now be described. In a server implementing the modelling process according to the invention within a measurement and monitoring process, collected data sent using a protocol or originating from external data sources in real time or off-line, crosses two abstraction layers. An initial layer, called polling abstraction layer (PAL), creates a single data source for real time data acquired either by polling, or from an external data source, independently from the originating protocols. The second layer, called acquisition abstraction layer (AAL), assembles this real-time data and the deferred data originating from an external source before processing them. The function of the abstraction layers is to mask the differences between the types of data supported by the measurement and monitoring process. The processor then only has to process a single type of data. Once the data has crossed the two abstraction layers, homogeneous Variables are obtained, whatever their origin.

The software installed on the Client stations implementing the process according to the invention has two functions: management of the information system model, and design and display of reports. To carry out the management of the information system and prepare reports, two Client interfaces are provided: a command line interface and a graphical interface.

Figure 3:
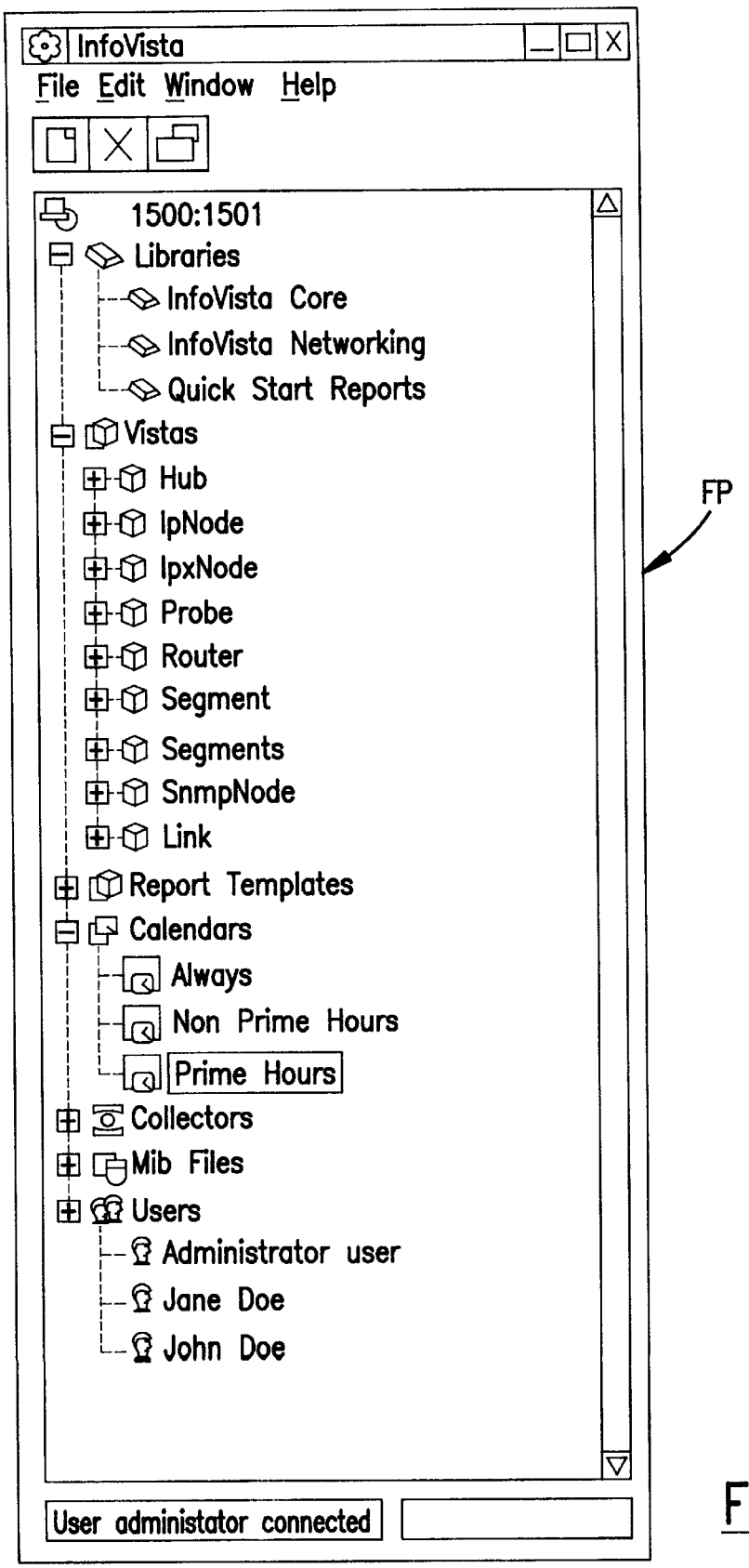
FIG. 3 represents an example of the window used in a software program implementing the process according to the invention.

After the launch of the software in which the process according to the invention is implemented, a main window MW is displayed, with reference to FIG. 3. This window provides an overall view of the information system model in the form of a tree structure. The root of the tree structure represents the active connection server. The objects in the model are organised into logical groups, each represented by branches of the tree structure. Vista objects thus include, as a non-limitative example:

application,

IP device,

IPX device, network,

SNMP device, segment, site.

Other branches of the tree structure correspond to the following objects:

Reports,

Calendars,

Collectors,

MIBs (Management Information Bases: structure of information available on data sources), Users.

With each group of objects, for example Segments, are associated sub-branches corresponding to the following objects:

Properties,

Instances,

Indicators and

Metrics.

The server implementing a measurement and monitoring process including the process according to the invention provides two functions. The first function consists in keeping a model of the information system infrastructure up to date. Each time components are added, deleted or modified, the server automatically updates the model of the information system and keeps a trace of the changes. A second function consists in converting user requests (launching of management reports) into a data acquisition schedule. Indicators are then calculated according to users' requests. The server is also in charge of timestamping and storing data according to the needs expressed by users in their requests.

User requests can be considered as windows which supply users with a partial view of the information stored by the server. The information contained in the user requests is optimised by the server. The optimised form contains Instance-Indicator pairs and a time information item. All redundant information is destroyed.

Once the data has been received by the server, the consolidation, aggregation and calculation processes start. Input data is converted into Variables, which are then used to calculate Indicators. These Indicators are in turn used as a basis for subsequent calculations, for example of other Indicators. Expressions and operators are applied to the Variables and/or Indicators. The results are then consolidated and aggregated in order to satisfy requests sent by users. All the requested data stored by the server is potentially available. If, at a later stage, users wish to obtain data over a longer period or wish to compare component performance levels, they need only to specify what they want to see via their request windows. The server will then make use of consolidation and aggregation techniques to analyse stored data, and will only display data which is of interest to the user.

The conversion of data into Indicators and then their representation in the form of graphs and reports involves three main stages: data acquisition, calculation and storage.

Real time input (RT input) and deferred input (DF input) is received by the server. In a practical implementation of the process according to the invention, the acquisition methods for public real time input (SNMP, Rmon, Rmon2, ProxyPing, ICMP) and proprietary input (RTdata for real time continuous external data sources, RTevent for discrete external data sources) are supported.

Data acquisition methods for public deferred input (RmonHistory) and proprietary deferred input (DFdata for deferred continuous external data sources, and DFevent for deferred discrete data sources) are supported.

By "ProxyPing" is meant a data acquisition method by which a master process, rather than sending an ECHO packet (Ping or ICMP) directly to a destination, requests a third party (Proxy) to carry out this operation on its behalf and to send it the result.

The function of the polling abstraction layer PAL is to group data originating from all these sources. The acquisition abstraction layer AAL converts real time and deferred data into Indicators.

Figure 4C:
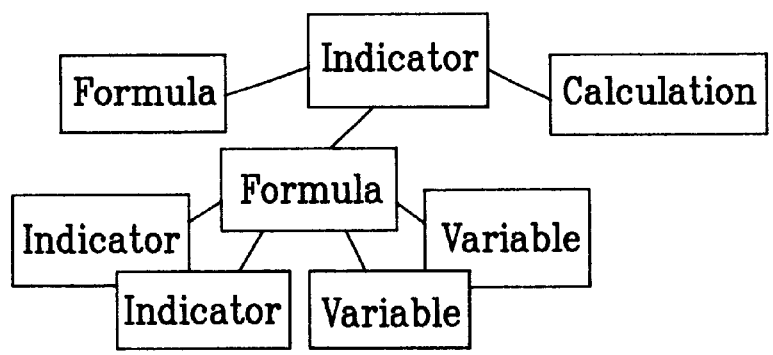

An Indicator can contain more than one Formula (FIG. 4C). There follows a description of a way of choosing the formula to be retained from a plurality of formulas. The server can be configured to provide preselection of formulas according to the type of Vista this Instance belongs to. The server then checks that the data required by the remaining formulas is available to calculate the Indicator. If this data is a Variable, the server interrogates the Instance to see if the Variable is available. If it is available, the Formula is considered to be valid and will then be used in subsequent calculations. If the Formula is not valid, the server will attempt to apply another Indicator Formula until it finds one which meets the requirements. If there are a plurality of Formulas meeting these requirements, the priorities associated with Formulas will determine the Formula to be retained. Again, if a valid Formula is located, it will be retained for future use. The valid Formula will automatically be used until the Indicator is modified. If a Formula is added or modified, all the Formulas in the Indicator are re-examined. It should be noted that this process is transparent to users. The process can retrieve, in real time and automatically, any modification, addition or deletion of an element of the information system.

As an example, the "CPU load" Indicator must be calculated with different Formulas for different types of device. In the event of information system development, the process according to the invention retrieves this development, updates the model and applies different Formulas and Instances during calculations. This is done automatically and in a transparent fashion for users.

The server starts the calculation as soon as it receives the necessary information. The RTbase and DFbase Indicators are calculated when the real time input is received. For DERIVED Indicators, the server keeps input data and delays calculation until all required data has been received. Moreover, DERIVED Indicators are themselves calculated from other Indicators (RTbase, DFbase or even DERIVED). The Indicators are calculated from Formulas. The Variables are specified in a management information base (MIB).

The Variables and Indicators processed can be scalars, but also and above all multidimensional matrices. The dimensions of these matrices are objects of the model, for example, groups of objects or non-modelled but implicit sub-objects, for example, multiple physical interfaces of a data transmission device.

Operations on these multidimensional matrices are carried out according to the association table principle, which allows the Indicators to retain a generic aspect.

The data storage mechanism implemented in the measurement and monitoring process including the modelling process according to the invention is completely dynamic. Data is stored in circular registers allocated to each Indicator/Instance pair.

Modifications made to the information system model are stored in the form of History objects. These objects are created when Instances are added to or deleted from a Collection. History objects are also created each time an Instance is added to or deleted from a Group of Instances.

Collections are the direct expression of user polling requests. A collection comprises a list of Indicators, a list of Instances, a polling interval, a storage interval and a number of samples.

The data collection process is carried out under the control of a Collector object which contains a list of user requirements for the Graph (Indicators to be displayed, Instances to be monitored, display frequency, acquisition frequency and number of samples). It contains information necessary for the collection of data for a Graph. The Collector is generally created by the system automatically.

Figure 7:
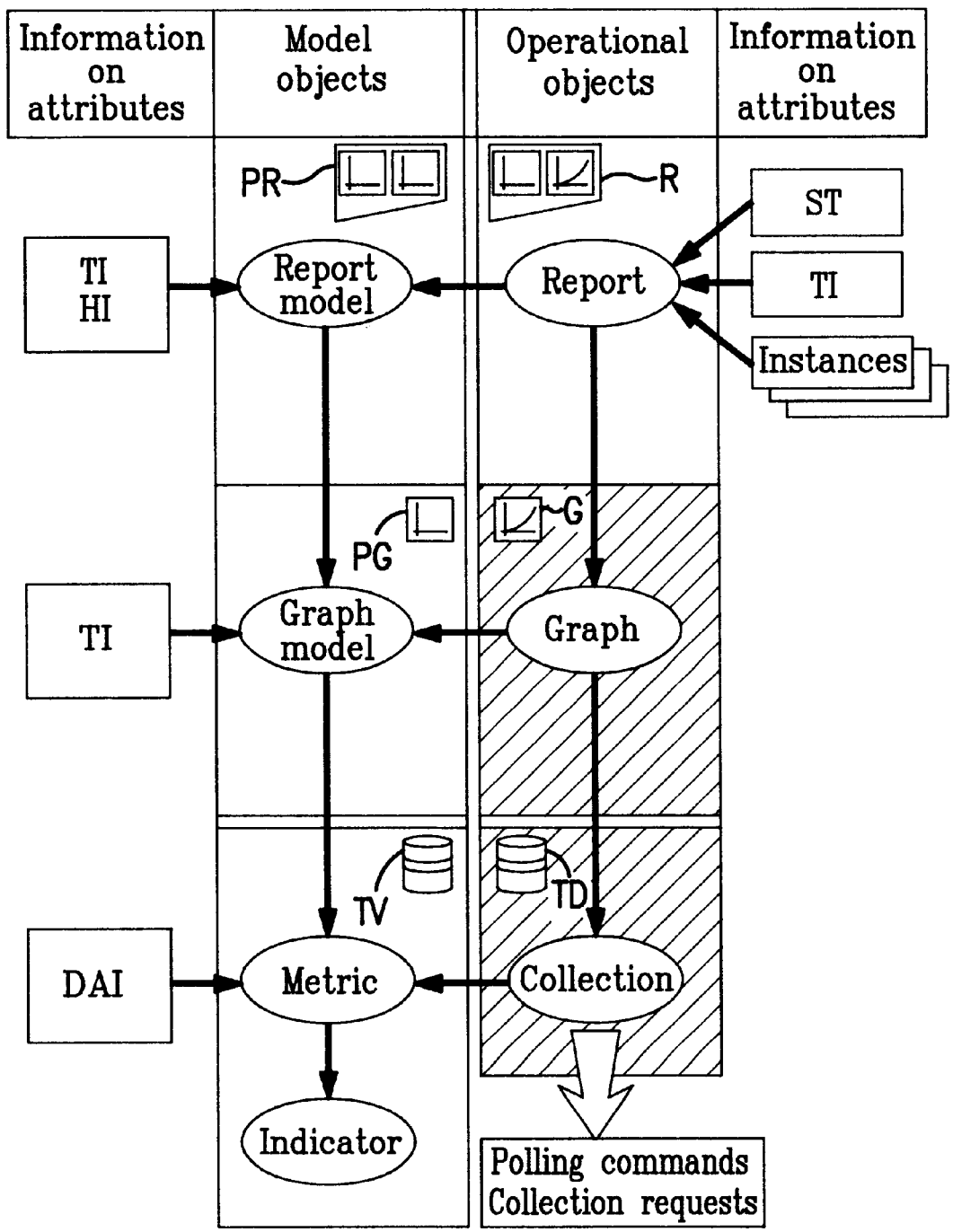
FIG. 7 is a diagram illustrating a modelling mechanism for reports within the process according to the invention.

Report modelling calls upon, on the one hand, modelling objects and, on the other hand, operational objects, with reference to FIG. 7. The objective is to obtain generic report models which are independent from Instances but only depend on the type of Vistas to which the Instances belong. Thus, a report model valid for one or more Vistas can be applied to all Instances of this/these Vista(s).

There now follows a description, provided as a non-limitative example, of a method for creating the dynamic model implemented in the modelling process according to the invention.

The dynamic model is based on five fundamental concepts which are the collections defined above, logical DATAslots, physical DATAslots, POLLslots and UPDATEslots, with reference to FIG. 6.

Logical DATAslots are a translation, simplified and optimised by eliminating redundant requests, of the collections comprising an Indicator, an Instance, a storage interval and a number of samples. Logical DATAslots are connected by directed relationships which guide the flow of data involved in the consolidation of Indicators and the evaluation of DERIVED Indicators. Certain logical DATAslots constitute entry points for external data (RTbase and DFbase Indicators) and are exclusively used as departure points for relationships. They are the only ones which include a polling frequency which is optimised by elimination of redundant requests.

Physical DATAslots correspond to the storage of data the acquisition and calculation of which are controlled by logical DATAslots.

POLLslots are associated with logical DATAslots which are entry points. They are involved in operations connected with polling:

planning, including calendar management,
 advanced optimisation regarding variables between several Indicators,
 transmission of elementary requests to the different data sources,
 awaiting of data, management of time-outs, retransmission and reassembly,
 data propagation and evaluations under the control of the logical DATAslots, and
 flow control for management of pollings beyond the server's capacity.

UPDATEslots are used as centralised points of passage for collected data before calculation and storage. They allow downstream flow control complementing the upstream flow control carried out at the POLLslots.

For a DERIVED Indicator, it is possible to indicate that values are not to be kept. Each request for a value for the Indicator then entails a recalculation. This can avoid the need for storage of an Indicator which can easily be computed from another, for example using an offset lag operator. This allows the user to make his own choice balancing storage space against calculation time.

Any Indicator can impose a minimum and/or maximum polling interval, and by extension a minimum display interval, for example equal to the minimum polling interval. This does not depend on the user but:

on the properties of certain operators which, by introducing the notion of consolidation interval, impose an upper limit on the polling interval, for example the maxt operator which calculates the moment when the variable reaches its maximum over a given time interval;
 on the use of calendar management which forces the polling interval to remain lower than the resolution of the calendar used;
 on the Indicators comprising a DERIVED Indicator which propagate the constraints existing at their level;
 on the variable properties for certain protocols (ICMP, ProxyPing) which impose a minimum polling interval. Indeed, in the case of ProxyPing, the polling interval must be greater than the duration of execution of the operation requested of the Proxy.

For each Indicator, three utilisation counters are kept: utilisation in a DERIVED Indicator and/or a Metric, utilisation in a collection, and storage space utilisation. These three counters are in particular used as criteria to determine authorised modifications to an existing Indicator.

It is sometimes desirable to allow a user to replace the gross value, usually numerical, of an Indicator or a parameter with an alternative form, often alphanumerical, more explicit, for example the replacement of an IP address with the Instance name. Two approaches are possible:

a static approach: selection of the representation is part of the definition of the report and the server sends the indicated representation to the client;

a dynamic approach: the server supplies all possible representations to clients which allow users to dynamically adjust display using a contextual menu.

In both cases, the client can optionally indicate, as regards collection, the alternatives to be returned for the Indicator and parameter values. A single configuration is sufficient as all Indicators of a collection are of the same type and have the same parameters.

Each logical DATAslot is identified in a unique manner by a triple combination <rate, Indicator, Instance> in which rate is the storage frequency. The POLLslots in which <Indicator, Instance> are equal constitute a consolidation line. Each slot groups the requests of the different collections in terms of the number of samples and the polling frequency. Requests of internal origin, in the context of optimisation, complete the third element of the above combination.

The number of samples to be kept for each slot corresponds to the greatest demand. Polling frequency is only used by POLLslots which constitute entry points and it is calculated taking the maximum of all requests for the consolidation line.

Logical DATAslots are connected by directed relationships which guide the flow of data involved in the consolidation of Indicators and the evaluation of DERIVED Indicators.

Each relationship's type and originating slot are retained in input. In output, each relationship's destination slot is retained. POLLslots having no output relationship are terminal points for data flow.

Polling and storage intervals are indicated using a multiple n of a base unit. Accumulation of intervals is preferably resynchronised periodically in relation to a higher base.

Logical DATAslots and relationships are not retained when the server stops. They are reconstructed when it starts up by the implicit start-up of all collections active when the server stopped.

The different operations directly or indirectly concerning logical DATAslots are creation, modification and deletion, but also stopping and starting.

Logical DATAslots and the relationships corresponding to a collection are created when it starts up, which can be explicitly requested when it is created, and deleted when it stops, implicit on deletion. The modification only has an effect if the collection is active.

The evaluation of an RTbase Indicator (cf. FIG. 5) consists in calculating a result from an UPDATEslot's data. Evaluation of a DERIVED Indicator consists as for an PTbase Indicator in calculating a result from the data on an UPDATEslot. Evaluation by consolidation is carried out by calculating the average over an interval. It is calculated using a lumped-affine function. For the integration to cover the whole interval, the values at the limits must be obtained. To do this, if necessary the last value of the previous interval is interpolated with the first value of the following interval respectively. These values are not retrieved in calculating information quality (number of measurements used to calculate the Indicator).

In the extreme case where the interval value is obtained by interpolation of two points which do not belong to the interval, the quality (in number of points used) is nil. If interpolation is necessary but the required data is not available, integration is then carried out on only part of the interval.

The entry point for storage of collected data is the pair <Indicator, Instance>. A set of combinations encountered for Indicator parameter values is kept for each pair, and an Indicator variation log is kept for each combination. The log is divided into a list of DATAslots. Each slot is characterized by three main information elements: its logical size, its physical size and its resolution.

Storage is cyclical for each slot: each new data item stored replaces the oldest item. When the value of an Indicator is practically constant and there are therefore constant value ranges, required storage space can be reduced using a "copy on write" mechanism (storage of the value once only and storage of references for subsequent occurrences) for character strings and other data of variable size.

Moreover, other forms of optimisation can be used. For example, as soon as three successive values are the same, the intermediate value is deleted. The effective implementation of this mechanism implies keeping the physical size lower than its logical size if this is sufficient to store in optimised form a number of samples equal to its logical size.

When pollings are stopped and/or deleted by the user, this entails a reduction in the logical size of certain POLLslots. In the most extreme case, this size can be reduced to zero.

The physical size is not immediately reduced in order to avoid too sudden a reduction in stored data. Data is deleted at a rate equal to that of cyclic overwriting. When the physical size reaches zero, the slot is completely deleted. This has no impact as its link with any logical DATAslot disappeared when its logical size changed to zero.

Resolution of stored data may locally be lower or greater than slot resolution as a result of collection variations. This has no impact as each value is accompanied by a dating.

Storage of values may for example be by full "column", that is, individual values corresponding to the various combinations of the parameter values, referenced by the same dating, are simultaneously received and stored.

The POLLslot is the logical representation of pollings for each <Indicator, Instance> pair concerned. It contains the following information:

from the Indicator,
   list of variables,
   list of parameters for each variable,
   calendar
from the Instance,
   the Vista and the Instance name,
   all the property values used by the polling, for example the IP address and SNMP community names,
from the logical DATAslot,
   polling frequency,
   a link to the logical DATAslot.

All the above information is fixed apart from user-defined modification of collections. Each slot also contains timestamping and type of the next related action to be carried out.

Polling frequency can be used to define a polling schedule for each POLLslot. Each possible action must be carried out in a clearly defined time span in relation to this schedule.

If there is no response from a device, requests are resubmitted. This occurs after an interval which is doubled each time there is no response and divided by two each time there is a response. The initial and minimum value is 1 s., the maximum value depends on the last request transmission limit for a polling.

For the implementation of calendar management of the polling, it is sufficient to retrieve the calendar when calculating timestamping of the next polling.

At the end of polling, terminated normally or by error, the date of the next polling is calculated.

This mechanism allows management of occasional errors. In the event of chronic server undercapacity, the mechanism inevitably leads to a saturation of evaluation processes as it is quicker to create an UPDATEslottimeout than it is to store it. It is necessary to implement a mechanism for reducing polling frequencies jointly controlled by polling threads and evaluation threads.

An essential optimisation for polling is the global processing of several POLLslots falling due simultaneously. The different POLLslots must fall due on the same operation (for example, sending data, awaiting data) and all or part of the variables must originate from the same Instance common to all POLLslots.

It must then be determined whether global processing affords any gain. As this only depends on POLLslots' static characteristics, it is possible to keep the result once determined.

As regards polling, the desired gain is a gain in bandwidth possibly to the detriment of CPU load. The gain is optimum when POLLslots have common variables, but if not a gain can still be hoped for given the information overheads needed for encoding a network packet if the protocol used allows the request of several variables in a single packet.

As regards the SNMP protocol, global processing must not entail exceeding the maximum packet size. Exceeding this size is currently processed as an error and even if a resumption mechanism is subsequently implemented, it is more costly than the gain sought. There is however no risk when the different POLLslots have the same variable list or when variables are all of a known size.

An UPDATEslot contains all information needed to evaluate an RTbase Indicator:

a list of <variable, value> pairs as the potential presence of unused variables in the evaluation must be retrieved, unique timestamping, and a reference to the logical DATAslot to be used as a departure point for the evaluation.

UPDATEslots are created for POLLslots by consolidating partial results. Once complete, they are detached from POLLslots and placed in a global list.

This allows processing of results of polling n and execution of polling n+1 to be conducted in parallel. The existence of a central grouping point allows retroaction on the polling in the event of accumulation of unprocessed results.

UPDATEslots are processed by several calculation test routines which administer direct calculations, indirect calculations (propagation) and storage of results.

Modelling of Variables implemented in the process according to the invention includes SNMP modelling, but has been greatly extended to allow modelling of variables originating from any source and in particular to be independent from protocols.

Among others, the following Variable parameter categories can be mentioned, corresponding to different types of use:

regular The parameter corresponds to a variable size. The size of a variable is therefore its number of regular parameters. The different possible values are retrieved on polling. This is the most standard form of use.

example: ifInOctets [ifIndex]

where ifIndex represents the device interface number.

instance The parameter no longer corresponds to a variable size as its value is unique. This value is a property value for the Instance to which this Indicator is applied. It is not an intrinsic parameter property but a possible use of any parameter of the regular category.

example: ifInOctets [ifIndex=Interface]

where Interface is a property of the Vista on which the Indicator is defined.

inline The parameter no longer corresponds to a variable size as its value is unique. This value is fixed by the user when the variable name is entered in a formula.

example: ciscoPingAvgRtt [ciscoPingProtocol=IP]

automatic The parameter no longer corresponds to a variable size as its value is unique. It is the result of an internal software process.

example: etherStatsPkts [etherStatsIndex=automatic]

monotonic The parameter always increases each time new data is acquired.

composite A composite parameter is defined independently from an Indicator's formulas. However, its implementation, which consists in retrieving an additional variable and carrying out a sort of parameter substitution between the Indicator value and the variable value, can easily be expressed using the following syntax:

example: B[ifIndex/ifDescr,srcAddr,dstAddr] =merge (A[ifIndex,srcAddr,dstAddr], ifDescr[ifIndex])

For the requirements of the process according to the invention, it has been necessary to extend the notion of the MIB (Management Information Base) file beyond the usual sense (SNMP) to allow retrieval of the new types of variable described above. Traditional MIB files using ASN.1 syntax are too limited to express all the semantic richness that are to be associated with Variables as soon as they are defined. Moreover, SNMP variables only represent part of the Variables of the process according to the invention. However, these traditional MIB files cover a non-negligible part of the methodology for defining Variables. In the following text, the term MIB will be used in its extended sense as defined previously.

A MIB base can be considered as homogeneous as regards definition of variables and by extension for their display and/or their designation. On the other hand, the mechanism to be implemented to retrieve the variable value varies from one variable to another.

When a MIB file is loaded, the server analyses its contents and creates one or more MIB bases. The MIB base is integrated into a standard record tree structure for the denomination of managed objects. At the same time, the server creates objects to represent nodes in the MIB base. Objects created by the process according to the invention are represented in a tree structure with n levels, for example four: Variables, Groups, Modules and Parameters. Variables are the only elements of the tree structure which are necessary for the server to operate. A MIB base can advantageously be represented graphically in the form of juxtaposed columns (flat representation) with reference to FIG. 8.

There are three typical cases for use of MIB bases:

an information system device supporting the standard SNMP protocol, supplied with SNMP agents which the process according to the invention can interrogate to obtain data;

an information system device supporting a specific protocol, supplied with its own agents and its own specific MIB file;

a device not supplied with a MIB file, for which a MIB file can be written using the syntax supported by the process according to the invention. This will be used in particular for data not accessible via SNMP.

For the practical implementation of the process according to the invention, the following tasks must be provided for:

creation of MIB files creation of Vistas, creation of Variables, creation of Indicators, creation of Report Models, creation of Instances, creation of Instanced Reports (association of Instances with Report Models), modification of Reports, and administration functions.

Variables constitute the calculation basis for Indicators. In order to ascertain which Variables are available on an element of the information system, the MIB files defined on this element are first read. The server then creates a list of available Variables by analysing MIB files associated with MIB bases.

Figure 8:
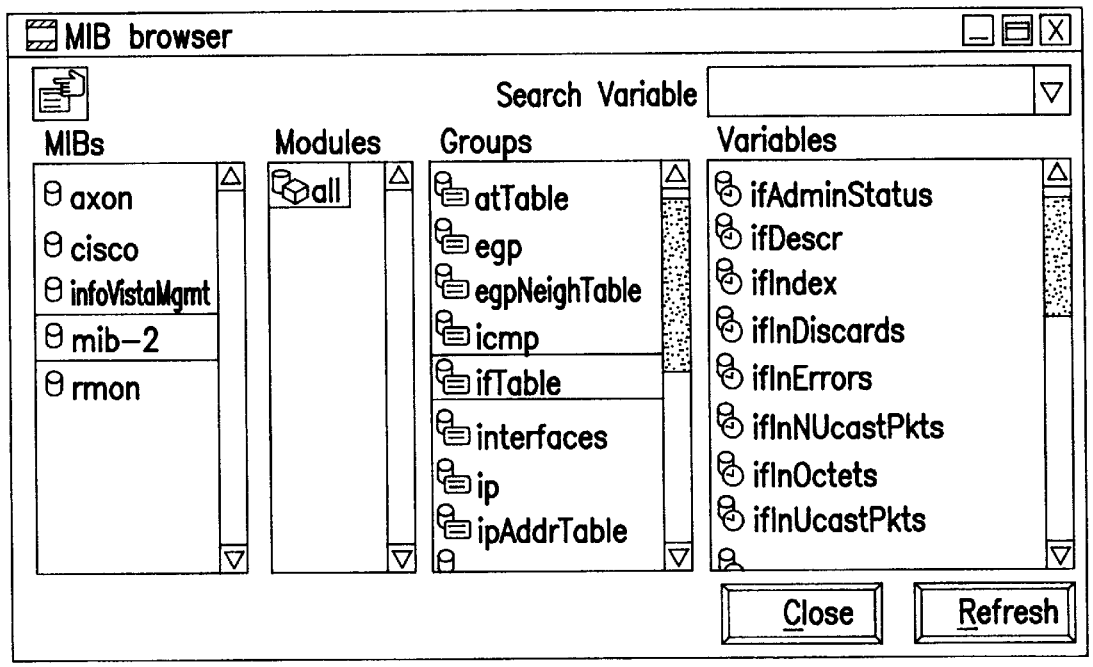
FIG. 8 is a screen dump of a flat representation of a MIB structure.

During analysis of a MIB file, the server creates MIB, Module, Group and Variable objects corresponding to the MIB base nodes, with reference to FIG. 8.

The configuration of an external data source entails, on the one hand, advising the system which Variables are available, on which system these Variables are available and which protocol must be used to access these Variables and, on the other hand, configuring the elements which will operate with the system according to the invention.

These operations are preferably carried out automatically. The MIB base Group object indicates the acquisition protocol associated with each variable. The system then attempts to obtain the information required to calculate each Instance-Indicator pair on the Collector.

If the required information is a Variable, the process according to the invention performs a polling on the specified Instance. If the model was correctly configured by the user, the Instance supplies the requested data.

If the model was not correctly configured, the Instance consulted returns an error message. The Server retains in memory the fact that the Instance-Indicator pair is invalid, and the Collector is rejected.

The Collector represents a set of Instance-Indicator pairs. The status of each pair is monitored by the server and is represented by a Status object.

Compilation of a formula, in a practical implementation example, necessitates knowing the Indicator type (Base Indicator or DERIVED Indicator) and the associated Vista.

When a client sends the server a new formula, an evaluator compiles the formula. The object of this compilation is to check that the formula conforms with syntax and to accelerate evaluation of the formula. The compiled form of the formula must be persistent. The server does not recompile formulas on each start-up. During compilation, the formula is represented by a direct acyclic graph (DAG) the sheets of which are either constants or variables for Base Indicator formulas or Indicators for DERIVED Indicator formulas.

The lexical analyser knows the type of the Indicator to which the formula being compiled belongs. It therefore knows whether an identifier belongs to the variable name space or to the Indicator name space.

An identifier can be either a full identifier or an incomplete identifier. In this case, the reference is ambiguous and consultation of the information system may return a list of variables or of Indicators. The SMIvariable class and the ISindicator class must supply a method for consulting the base which returns the list of selected objects.

Construction of expressions involves selection of the operator and calculation of the expression type. Expression parameters are selected by subtracting the parameters used for reduction from the operand parameters of an operator. If the operands do not have the same parameters, an inclusion relationship must exist between the different parameter lists. The parameters of the reduction list are subtracted from the global list.

For each operand, the compiler creates a table used to establish the correspondence between its parameters and the parameters of the global list.

The compiler creates parameters in the information system in the case of composite parameters and parameter aliases. The compiler copies associated types rather than sharing the type with the parameter or the source variable. This choice is made in order to simplify the unloading of objects from the base.

The compiled form is constituted by a series of intermediate code instructions and a register file. The register file allows instructions to communicate their results. It is a table which points to values (DATAvalue or DATAvalueNP). The number of registers is determined during compilation. It is a property of the formula and of the Indicator. It corresponds to the number of Instances of the EVALexpr class. Each register has a status (empty or initialised) and an Indicator used to indicate whether its value can be deleted. This piece of information can in certain cases allow re-use during evaluation of the DATAvalue or DATAvalueNP object pointed to by the register. So that the register file can be initialised at the beginning of evaluation, the compiler must build a list of registers to be initialised.

During formula analysis, the compiler issues intermediate code instructions. The operands of an instruction originate from three sources:

EVALdata data for invoking the evaluator, results of other instructions, constants generated during the compilation stage.

Each operand is accessed through its own reserved register. A table arguments__ contains the register number for operator arguments and result__ is the result register number.

Each evaluation of a formula requires allocation of a new register file. Its initialisation is in two stages:

initialisation of registers containing the constants, initialisation of registers accessing EVALdata values.

Instructions are executed sequentially. An instruction is executed by calling its operator.

Of course, the invention is not limited to the examples which have just been described and numerous modifications can be made to these examples without exceeding the scope of the invention. The modelling process according to the invention can also be implemented for the control of industrial processes, if that process involves components or devices, networks and software applications which may supply data in real time or offline which might be processed in a manner analogous to what has just been described. Moreover, the modelling process according to the invention must not be considered as dependent on a particular performance measurement and service quality monitoring system such as that which has just been described for purely illustrative purposes. In particular, this modelling process can be applied equally well to homogeneous or heterogeneous information systems.

We claim:

1. Process for modelling an information system, in order to measure performance and monitor service quality for this information system, said process including object-oriented modelling of said information system, each element of said information system being represented by an Instance, wherein:

data relating to a first Instance are collected on said first Instance or on one or several other Instances, said collected data are attached to said first Instance via said object-oriented modelling of the information system, classes of objects of the information system, called Vistas, are defined, each Vista comprising Properties and/or Indicators, the instances of the information system belonging to one or several from said Vistas, characterized in that said process further comprises rules defining inheritances between different Vistas, and different models of the information system is definable from a same set of Vistas via different rules.

2. Process according to claim 1, characterized in that modifications of the Instances of the information system are historized and stored.

3. Process according to claim 1, applied to performance measuring and monitoring of a service quality for an information system, characterized in that the oriented-object modelling of the information system further comprises modelling Indicators computed from Variables representing data collected within said information system.

4. Process according to claim 3, characterized in that the Indicators are computed by associative computing techniques.

5. Process according to claim 3, characterized in that the Indicators are computed by a t least one Formula containing other Indicators and/or Variables acquired by a real-time polling, and/or Variables acquired from external sources in real-time or deferred-time.

6. Process according to claim 3, characterized in that it further comprises a process for historically storing the Indicators.

7. Process according to claim 6, characterized in that the history-storage process implements data-warehousing techniques.

8. Process according to claim 6, characterized in that the Indicators are stored in an object-database.

9. Process according to claim 1, characterized in that the oriented-object modelling further comp rises modelling reports to be generated.

10. Process according to claim 1, characterized in that the Variables corresponding to data from various data sources are modelled by use of MIB files extending the syntax of the SNMP protocol, in order to homogenize the definition of heterogeneous data sources.

11. Process according to claim 10, characterized in that the arborescence of the MIBs is graphically displayed under the form of juxtaposed columns, according to a flat displaying mode.

12. System for measuring performance and monitoring the service quality for an information system, implementing the modelling process, said system including:

means for performing object-oriented modelling of the information system, each element of said information system being represented by an Instance, said oriented-object modelling means being arranged for defining classes of objects of the information system, called Vistas, and for setting rules defining inheritances between different Vistas, means for modelling and collecting data within the information system, said collected data coming from various data sources, means for processing collected data and for computing Indicators including service quality Indicators, and means for generating reports and/or graphs from said indicators, characterized in that the object-oriented modelling means are further arranged to generate rules defining inheritances between different Vistas and for defining, from a same set of Vistas, via different rules, different models of the information system.

* * * * *